United States Patent
Lorenz et al.

(10) Patent No.: US 11,781,523 B2
(45) Date of Patent: Oct. 10, 2023

(54) SECTION WIND TURBINE BLADE AND ASSEMBLY OF A SECTION WIND TURBINE BLADE

(71) Applicant: LM Wind Power A/S, Kolding (DK)

(72) Inventors: Gregory Walter Lorenz, New Orleans, LA (US); Christopher Daniel Caruso, Greenville, SC (US); Fritz Andres Campo, Carrboro, NC (US); Christopher Monk, Cowes (GB); Brian Scott Redmon, Baker, FL (US)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 17/475,524

(22) Filed: Sep. 15, 2021

(65) Prior Publication Data
US 2022/0082080 A1 Mar. 17, 2022

Related U.S. Application Data

(60) Provisional application No. 63/078,474, filed on Sep. 15, 2020.

(51) Int. Cl.
*F03D 1/06* (2006.01)
(52) U.S. Cl.
CPC ........ *F03D 1/0683* (2013.01); *F05B 2230/60* (2013.01)
(58) Field of Classification Search
CPC .... F03D 1/0683; F03D 1/0633; F03D 1/0675; F03D 13/10; F03D 80/00; F05B 2230/60;
(Continued)

(56) References Cited

U.S. PATENT DOCUMENTS 4,129,328 A * 12/1978 Littell .................. B25J 15/0061
  294/65
4,527,783 A *  7/1985 Collora ................. B25B 11/005
  269/297

(Continued)

OTHER PUBLICATIONS

European Search Report Corresponding to EP21163781 dated Aug. 12, 2021.

*Primary Examiner* — J. Todd Newton
*Assistant Examiner* — Wayne A Lambert
(74) *Attorney, Agent, or Firm* — Dority & Manning, P.A.

(57) ABSTRACT

A method for assembling a shell section of a wind turbine blade includes providing a support, the support comprising a surface having a primary surface portion configured for supporting a first component and a secondary surface portion configured for supporting a second component. The method also includes arranging a second component on the secondary surface portion such that an outer surface of the second component is facing the secondary surface portion. The method further includes arranging a first component on the primary surface portion such that an outer surface of the first component is facing the primary surface portion, and such that a first primary joint surface of the first component is facing a second joint surface of the second component. Arranging the first component includes applying a force to the first component to force the outer surface of the first component towards the primary surface portion and the first primary joint surface towards the second joint surface.

11 Claims, 6 Drawing Sheets

(58) Field of Classification Search
CPC ......... F05B 2230/604; F05B 2240/302; B29C 65/7832; B29C 65/7844; B29C 65/483; B29C 66/1282; B29C 66/12841; B29C 66/301; B29C 66/54; B29C 66/543; B29C 66/721; B29C 66/82423; B29C 66/8242; B29C 66/8322; B29L 2031/085; Y02E 10/72; Y02P 70/50

See application file for complete search history.

(56) References Cited

U.S. PATENT DOCUMENTS

| | | | | |
|---|---|---|---|---|
| 7,276,200 B2 * | 10/2007 | Jacob | .................. | B29C 49/70 |
| | | | | 425/444 |
| 10,569,906 B2 * | 2/2020 | Littlejohn | ................ | B64F 5/10 |
| 2009/0148300 A1 * | 6/2009 | Driver | .................. | B29C 66/721 |
| | | | | 416/223 R |
| 2009/0169323 A1 * | 7/2009 | Livingston | ............ | F03D 1/0675 |
| | | | | 410/120 |
| 2010/0310379 A1 * | 12/2010 | Livingston | ............ | F03D 1/0675 |
| | | | | 29/889.71 |
| 2011/0167633 A1 * | 7/2011 | Anasis | .................... | B23P 6/002 |
| | | | | 29/889.1 |
| 2011/0211969 A1 * | 9/2011 | Nies | ...................... | F03D 1/0675 |
| | | | | 156/292 |
| 2012/0124833 A1 * | 5/2012 | Arendt | .................... | F03D 13/40 |
| | | | | 29/889.7 |
| 2014/0237793 A1 | 8/2014 | Gamboa | | |
| 2014/0259669 A1 * | 9/2014 | Busbey | .................. | F03D 13/10 |
| | | | | 29/889.71 |
| 2014/0353894 A1 * | 12/2014 | DesJardien | ............... | B64F 5/10 |
| | | | | 269/21 |
| 2017/0074236 A1 | 3/2017 | Hynum et al. | | |
| 2017/0074238 A1 | 3/2017 | Tobin et al. | | |
| 2019/0136833 A1 | 5/2019 | Broome et al. | | |
| 2021/0078277 A1 | 3/2021 | Jespersen et al. | | |

* cited by examiner

SECTION WIND TURBINE BLADE AND ASSEMBLY OF A SECTION WIND TURBINE BLADE

RELATED APPLICATION

The present application claims the benefit of Provisional Application No. 63/078,474, filed Sep. 15, 2020.

FIELD

The present disclosure relates to assembly of a wind turbine blade, more specifically the disclosure relates to assembly of a wind turbine blade comprising a first component and a second component, and optionally more components.

BACKGROUND

As the demands for blades for wind turbines tend towards blades of increasing lengths, attention is increasing on concepts of manufacturing blades in sections for being assembled at the installation site or regional sites. By assembling the wind turbine blade at an installation site or a regional site reduces the costs for transportation, as the sections may be smaller and easier to handle. Furthermore, manufacturing the sections at one location and assembling them at another location may improve the quality of the wind turbine blades as each location may focus on fewer and more specific tasks.

Such wind turbine blade, comprising a plurality of sections, may be known as a split blade, or two-part blade, or segmented blade or similar.

BRIEF DESCRIPTION

Aspects and advantages of the invention will be set forth in part in the following description, or may be obvious from the description, or may be learned through practice of the invention.

It is an object of the present disclosure to provide a way of assembling sections of a wind turbine blade, such as a split/segmented wind turbine blade, where the wind turbine blade is manufactured by manufacturing two (or more) components and then joining them. In particular, it is an objective of the present disclosure to provide a faster way of assembling a wind turbine blade comprising two or more components.

Accordingly, a method for assembling a section, such as a shell section, of a wind turbine blade is disclosed, such as a shell section for a split blade, a two-part blade, or segmented blade. The method comprises providing a support. The support comprises a surface having a primary surface portion configured for supporting a first component. The support comprises a secondary surface portion configured for supporting a second component. The support may be a mold for forming the wind turbine blade, such as the shell section of the wind turbine blade, and/or part(s) of a mold for forming the wind turbine blade, such as the shell section of the wind turbine blade.

The method comprises providing a first component comprising an inner surface, an outer surface, a first primary end and a first primary joint part along the first primary end. The first component may further comprise a first secondary end and a first secondary joint part along the first secondary end.

The first primary joint part comprises a first primary joint surface facing opposite the inner surface of the first component. The first secondary joint part may comprise a first secondary joint surface facing opposite the outer surface of the first component.

The method comprises providing a second component comprising an inner surface, an outer surface, a second end and a second joint part along the second end. The second joint part comprises a second joint surface facing opposite the outer surface of the second component.

The method comprises arranging the second component on the secondary surface portion such that the outer surface of the second component is facing the secondary surface portion.

The method comprises arranging the first component on the primary surface portion such that the outer surface of the first component is facing the primary surface portion, and such that the first primary joint surface of the first component is facing the second joint surface of the second component.

The first component and/or the second component may correspond to a leading edge component, a trailing edge component, a suctions side component and/or a pressure side component.

The method comprises applying a force to the first component to force the outer surface of the first component towards the primary surface portion and the first primary joint surface towards the second joint surface. Application of the force to the first component may be provided as part of arranging the first component. Alternatively, application of the force may be provided after arranging the first component on the primary surface.

A first joining device may be provided. The first joining device may be configurable between a first configuration wherein an attachment part of the first joining device is extending from the primary surface portion and a second configuration wherein the attachment part is retracted and do not extend from the primary surface portion.

The attachment part of the first joining device may be attached to the outer surface of the first component, e.g. after arranging the first component on the primary surface portion. The first joining device may be transitioned from the first configuration towards the second configuration to apply the force to the first component. For example, applying the force to the first component may comprise transitioning the first joining device from the first configuration towards the second configuration to apply the force to the first component.

It is an advantage of the present disclosure, that a wind turbine blade comprising two or more sections may be assembled in a faster way and thereby reducing the assembly and manufacturing time of a wind turbine blade.

Also disclosed is a shell section of a wind turbine blade, such as a shell section for a split blade, a two-part blade, or segmented blade. The shell section comprises a first component comprising an inner surface, an outer surface, a first primary end and a first primary joint part along the first primary end. The first component may further comprise a first secondary end and a first secondary joint part along the first secondary end.

The first primary joint part comprises a first primary joint surface facing opposite the inner surface of the first component. The first secondary joint part may comprise a first secondary joint surface facing opposite the outer surface of the first component.

The shell section comprises a second component comprising an inner surface, an outer surface, a second end, and a second joint part along the second end. The second joint part comprises a second joint surface facing opposite the outer surface of the second component.

The first primary joint surface of the first component is facing the second joint surface of the second component.

The first component and/or the second component may correspond to a leading edge component, a trailing edge component, a suctions side component and/or a pressure side component.

Also disclosed is a system for assembling a shell section for a wind turbine blade. The system comprises a support comprising a primary surface portion configured support a first component. The first component comprises an inner surface, an outer surface, a first primary end and a first primary joint part along the first primary end. The first component may comprise a first secondary end and a first secondary joint part along the first secondary end. The first primary joint part comprises a first primary joint surface facing opposite the inner surface of the first component. The first secondary joint part may comprise a first secondary joint surface facing opposite the outer surface of the first component.

The support further comprises a secondary surface portion configured to support a second component. The second component comprises an inner surface, an outer surface, a second end, and a second joint part along the second end. The second joint part comprises a second joint surface facing opposite the outer surface of the second component.

The system may comprise a first joining device. The first joining device may be configurable between a first configuration wherein an attachment part of the first joining device is extending from the primary surface portion and a second configuration wherein the attachment part is retracted, e.g. wherein the attachment part does not extend from the primary surface portion.

The first joining device may be configured to apply a force to the first component towards the primary surface portion by attaching the attachment part to the outer surface of the first component and transitioning the first joining device from the first configuration towards the second configuration.

The first joining device may be attached to the support. For example, providing the first joining device may comprise attaching the first joining device to the support.

The attachment part of the first joining device may be configured to provide negative pressure between the attachment part and the outer surface of the first component. For example, attaching the attachment part to the first component may comprise providing negative pressure between the attachment part and the outer surface of the first component. The first joining device, e.g. the attachment part of the first joining device, may comprise a suction cup.

The primary surface portion may comprise a primary opening. The first joining device may be configured to extend through the primary opening in the first configuration. The first joining device in the first configuration may extend through the primary opening in the primary surface portion. The first joining device may be configured to extend and retract in a direction normal to the primary surface and/or normal to the primary opening.

A force may be applied to the second component to force the outer surface of the second component towards the secondary surface portion. For example, a second joining device may be provided. The second joining device may be configured to apply the force to the second component. The system may comprise the second joining device. The second joining device may be configurable between a first configuration wherein an attachment part of the second joining device is extending from the secondary surface portion and a second configuration wherein the attachment part is retracted, e.g. wherein the attachment part does not extend from the secondary surface portion.

The attachment part of the second joining device may be attached to the outer surface of the second component, e.g. after arranging the second component on the secondary surface portion. The second joining device may be transitioned from the first configuration towards the second configuration, e.g. to apply the force to the second component to force the outer surface of the second component towards the secondary surface portion. For example, applying the force to the second component may comprise transitioning the second joining device from the first configuration towards the second configuration to apply the force to the second component.

The second joining device may be configured to apply the force to the second component towards the secondary surface portion by attaching the attachment part to the outer surface of the second component and transitioning the second joining device from the first configuration towards the second configuration.

The attachment part of the second joining device may be configured to provide negative pressure between the attachment part and the outer surface of the second component. For example, attaching the attachment part to the second component may comprise providing negative pressure between the attachment part and the outer surface of the second component. The second joining device, e.g. the attachment part of the second joining device, may comprise a suction cup.

The secondary surface portion may comprise a secondary opening. The second joining device may be configured to extend through the secondary opening in the first configuration. The second joining device in the first configuration may extend through the secondary opening in the secondary surface portion. The second joining device may be configured to extend and retract in a direction normal to the secondary surface portion and/or normal to the secondary opening.

The shell section may comprise a third component. The method may comprise providing the third component. The third component may comprise an inner surface, an outer surface, a third end, a third joint part along the third end. The third joint part may comprise a third joint surface facing opposite the inner surface of the third component.

The first component and/or the second component may correspond to a leading edge component, a trailing edge component, a suctions side component and/or a pressure side component. The third component may correspond to a leading edge component, a trailing edge component, a suctions side component and/or a pressure side component.

The first secondary joint surface of the first component may be facing the third joint surface of the third component. The system may comprise a tertiary surface portion configured to support the outer surface of the third component. The third component may be arranged on the tertiary surface portion of the support such that the outer surface of the third component is facing the tertiary surface portion. The third component may be arranged on the tertiary surface portion of the support such that the first secondary joint surface of the first component is facing the third joint surface of the third component.

The shell section may comprise an adhesive between the first primary joint surface and the second joint surface and/or the first secondary joint surface and the third joint surface. For example, an adhesive may be applied between the first primary joint surface and the second joint surface and/or between the first secondary joint surface and the third joint surface. Alternatively, the first primary joint surface and the second joint surface and/or the first secondary joint surface and the third joint surface may be welded together, e.g. using thermoplastic welding or ultrasonic welding. The first primary joint part and the second joint part and/or the first secondary joint part and the third joint part may form a lap joint.

The first joining device and/or the second joining device may temporarily join the first component and the second component by applying the force while the first component and the second component are in contact. The first joining device and/or the second joining device may provide and maintain the force until the adhesive between the first component and the second component cures.

The third component and the first component may be adjoined while the adhesive between the first component and the second component is still curing. The first component, the second component and/or the third component may be permanently adjoined by the adhesive or the welding.

The first primary end and the first secondary end may be parallel, e.g. the first primary end and the first secondary end may be opposite ends of the first component. Alternatively, the first primary end and the first secondary end may be non-parallel, e.g. the first primary end may be perpendicular to the first secondary end, and/or the angle between the first end and the second end may be between 80-100 degrees. The first primary end may be parallel with a first tertiary end of the first component.

One or more or all of the ends, e.g. the first primary end, the first secondary end, the second end and/or the third end, may be straight, waved, notched, or serrated or a combination thereof.

The first component may comprise a first alignment part. The second component may comprise a second alignment part. The third component may comprise a third alignment part. The first alignment part, the second alignment part and/or the third alignment part may comprise a protruding element. The protruding element may be shaped as a dome or a cone. The protruding element may be removed after assembly of the shell section, e.g. by cutting or polishing or a combination thereof.

The primary surface portion may comprise a primary alignment part. The secondary surface portion may comprise a secondary alignment part. The tertiary surface portion may comprise a tertiary alignment part. The primary alignment part, the secondary alignment part and/or the tertiary alignment part may be shaped as a hole or a recess, e.g. to receive a corresponding protruding element of the first alignment part, the second alignment part and/or the third alignment.

The first alignment part and the primary alignment part may have a male and a female configuration. The second alignment part and the secondary alignment part may have a male and a female configuration. The third alignment part and the tertiary alignment part may have a male and a female configuration.

Arranging the first component on the primary surface portion may comprise engaging the first alignment part with the primary alignment part. Arranging the second component on the secondary surface portion may comprise engaging the second alignment part with the secondary alignment part. Arranging the third component on the tertiary surface portion may comprise engaging the third alignment part with the tertiary alignment part.

The components, e.g. the first, second and/or third component, may be somewhat flexible, e.g. to allow the component to adapt to the respective surface portion of the support. The first component may be configured to adapt to the shape of the primary surface portion of the support. The second component may be configured to adapt to the shape of the secondary surface portion of the support. The third component may be configured to adapt to the shape of the tertiary surface portion of the support. For example, the components may be made of a fiber-reinforced material, e.g. with 5-50 mm thickness.

BRIEF DESCRIPTION OF THE DRAWINGS

Embodiments of the disclosure will be described in more detail in the following with regard to the accompanying figures. The figures show one way of implementing the present invention and are not to be construed as being limiting to other possible embodiments falling within the scope of the attached claim set.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
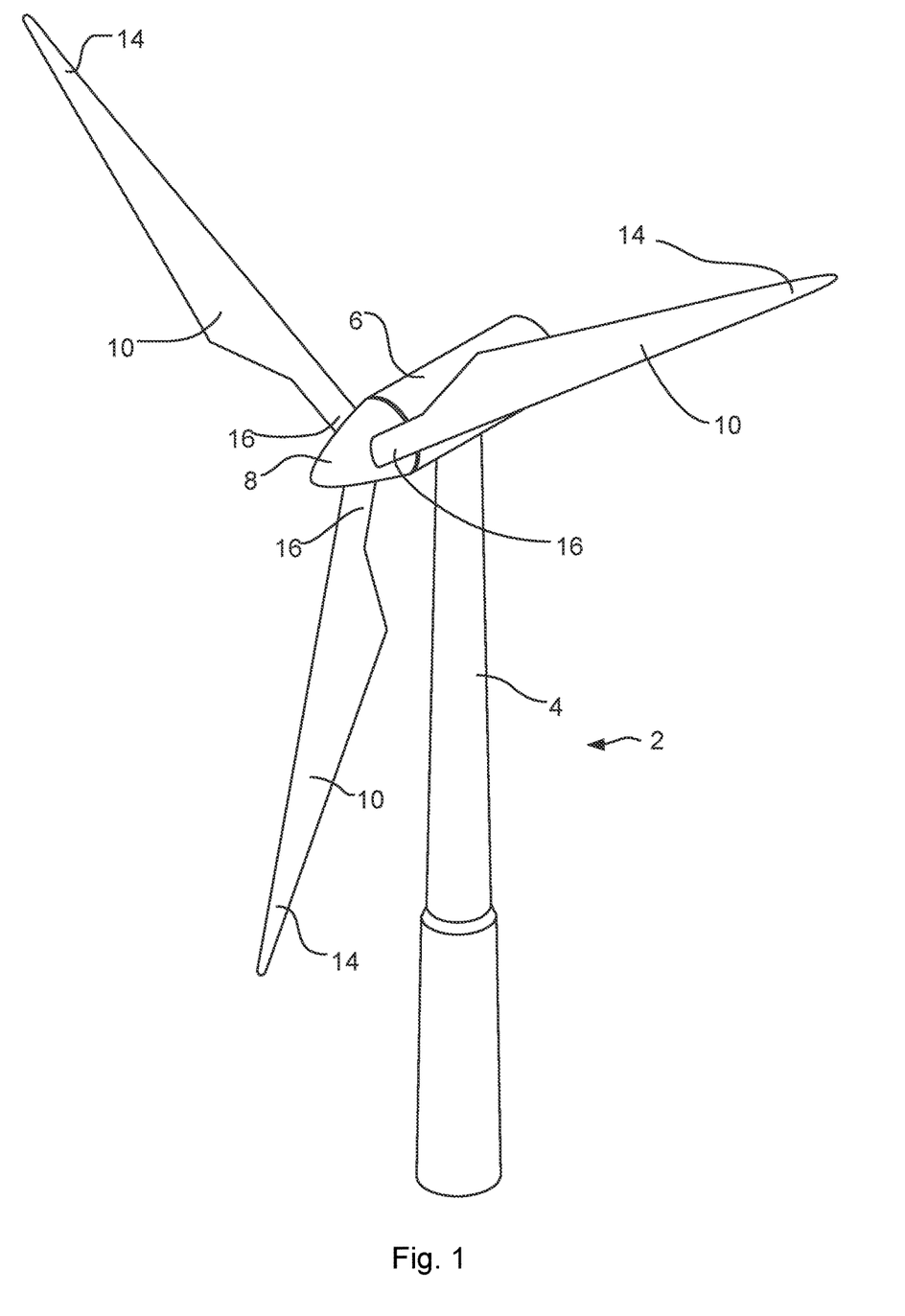
FIG. 1 is a schematic diagram illustrating an exemplary wind turbine.

Referring now to the drawings, FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
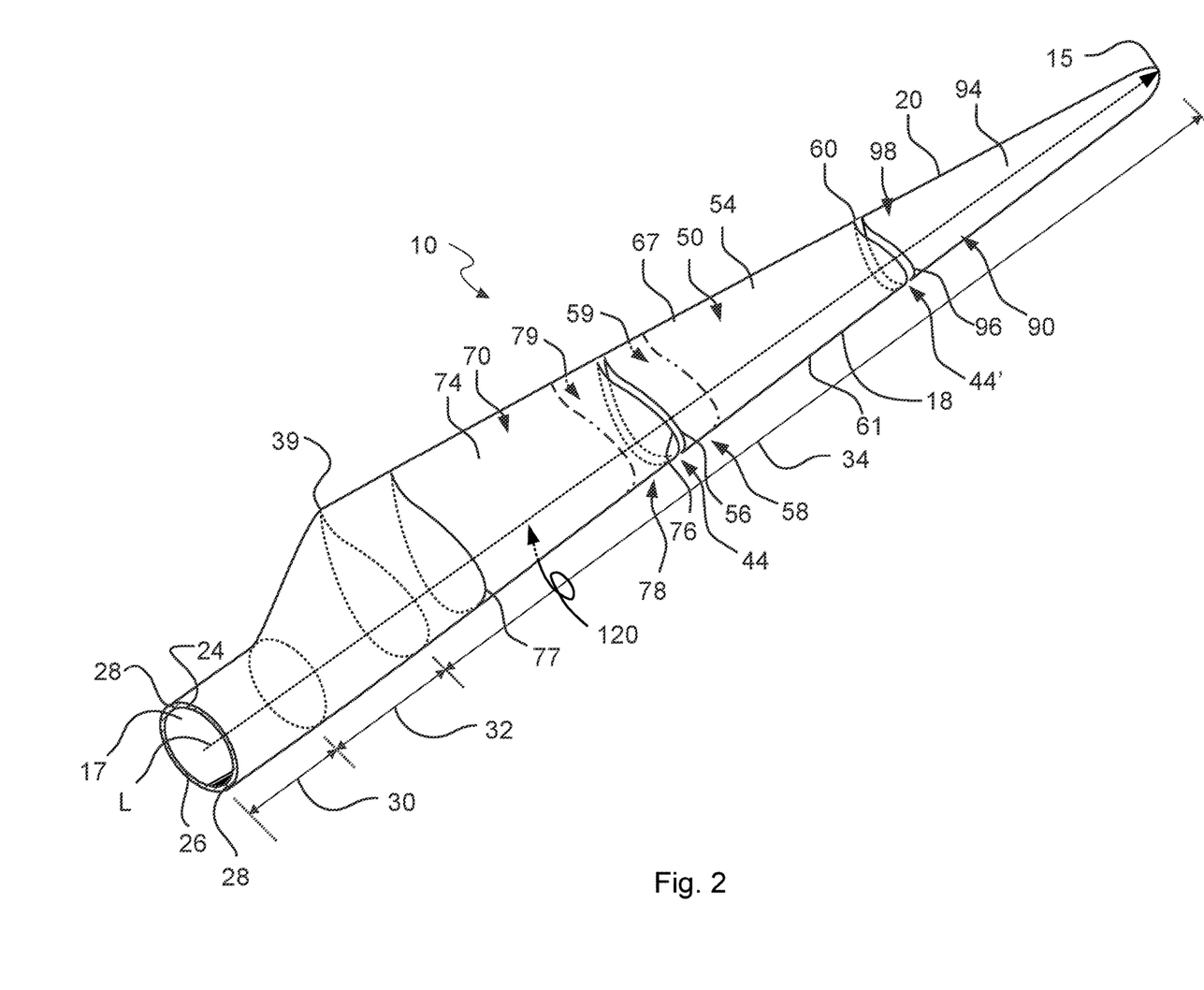
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 39 of the blade 10 is defined as the position, where the blade 10 has its largest chord length. The shoulder 39 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell, which may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape. The wind turbine blade 10 extends along a longitudinal axis L. The root end 17 extends in a root end plane, substantially perpendicular to the longitudinal axis L.

The wind turbine blade 10, as illustrated, is a so-called split blade, or two-part blade, or segmented blade. Each of the blade shell parts 24, 26 may be formed by one or more components. For example, the first blade shell part 24 may comprise a first component 50, a second component 70 and a third component 90. The second blade shell part 26 may comprise a fourth component 120 and one or more further components.

The first component 50 comprises a first primary end 56. The first component 50 may extend along the longitudinal axis L from the first primary end 56. The first component may further comprise one or more secondary ends 60, a first tertiary end 61 and/or a first quaternary end 67. The first primary end 56 and the first secondary end 60 may be parallel, as illustrated, and extend in the transverse direction of the wind turbine blade 10. In an alternative example, the first primary end 56 and the first secondary end 60 may be perpendicular. The first component 50 may, as illustrated, extend in the transverse direction between the first tertiary end 61 and the first quaternary end 67. The first tertiary end 61 and the first quaternary end 67 may be parallel and extend in the longitudinal direction of the wind turbine blade 10, as illustrated. The first tertiary end 61 may extend along the leading edge 18 of the wind turbine blade and the first quaternary end 67 may extend along the trailing edge 20 of the wind turbine blade 10. However, the ends 61, 67 may, alternatively, extend offset from the training edge 20 and the leading edge 18.

The first component 50 comprises an inner surface (not visible) and an outer surface 54 opposite the inner surface. The first component 50 comprises a first primary joint part 58 along the first primary end 56.

The second component 70 comprises a second end 76. The second component 70 may extend along the longitudinal axis L from a second end 76, as illustrated, e.g. to a second secondary end 77. The second end 76 and the second secondary end 77 may be parallel and extend in the transverse direction of the wind turbine blade 10. The second component 70 comprises an inner surface (not visible) and an outer surface 74 opposite the inner surface. The second component 70 comprises a second joint part 78 along the second end 76.

The first primary end 56 and the second end 76 may extend in the transverse direction of the wind turbine blade 10.

The third component 90 comprises an outer surface 94 and an inner surface (not visible) opposite the outer surface 94. The third component 90 comprises a third joint part 98 at a third end 96.

For illustrative purposes the wind turbine blade 10 in FIG. 2 is illustrated with a gap between the first component 50 and the second component 70, and between the first component and the third component 90. However, as will be explained in the following, the first component 50 and the second component 70 forms a joint 44 by overlapping the first primary joint part 58 with the second joint part 78 during the assembly process of the wind turbine blade (see FIGS. 3 and 4), similarly, the first component and the third component 90 forms a joint 44'.

Figure 3:
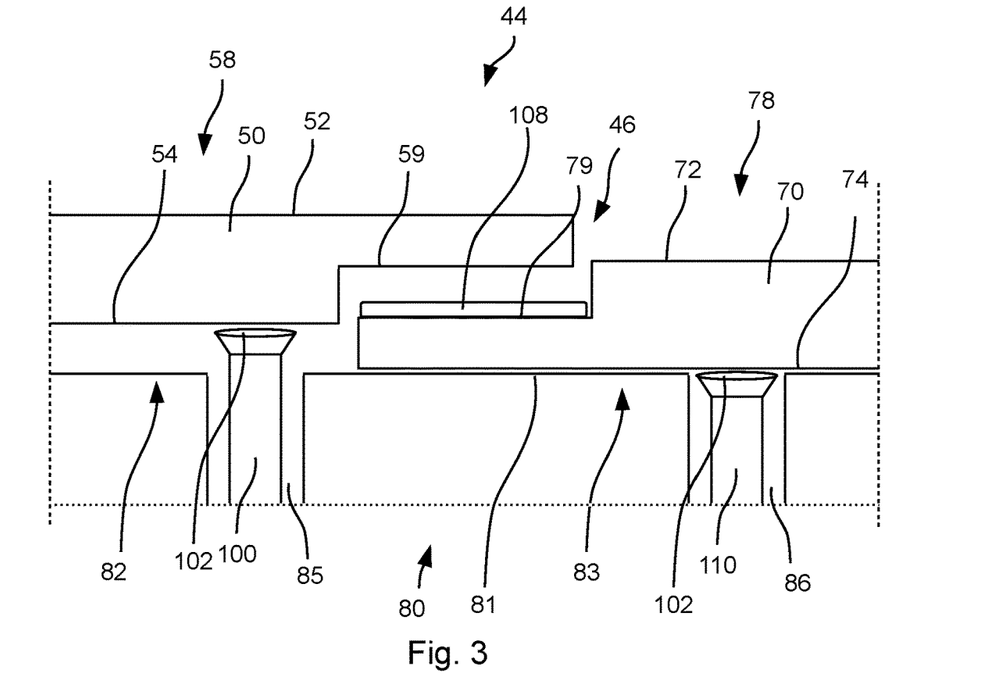
FIG. 3 is a schematic diagram illustrating an exemplary shell section of a wind turbine blade.

FIG. 3 is a schematic diagram illustrating a joint 44 formed by two components 50, 70, such as the first component 50 and second component 70 of FIG. 2.

The joint 44 may be formed by arranging the components 50, 70 on a support 80. The support comprises a primary surface portion 82 configured to support the first component 50 and a secondary surface portion 83 configured to support the second component 70. A first joining device 100 may be configured to extend and retract from a primary opening 85 in the primary surface portion 82. A second joining device 110 may be configured to extend and retract from a secondary opening 86 in the secondary surface portion 83. The joining device 100, 110 comprises an attachment part 102 configured to attach to the outer surface of a component. Each of the joining devices 100, 110 is configurable between a first configuration where it is extended and a second configuration where it is retracted. In the extended configuration the joining device 100, 110 extends from the surface 81 of the support 80. In the retracted configuration the joining device 100, 110 does not extend from the surface 81 of the support 80. The first joining device 100 is illustrated in an extended configuration, such as the first configuration. However, the first configuration may provide a joining device 100, 110 in an even further extended configuration than illustrated in FIG. 3. The second joining device 110 is illustrated in a retracted configuration, such as the second configuration. However, the second configuration may provide a joining device 100, 110 in an even further retracted configuration than illustrated in FIG. 3.

The first component 50 comprises a first primary joint surface 59 opposite the inner surface 52 of the first component 50 and the second component 70 comprises a second joint surface 79 opposite the outer surface 74 of the second component 70. The first primary joint part 58 and the second joint part 78 may form a lap joint.

The joint 44 is formed by arranging the second component 70 on the secondary surface portion 83 such that the outer surface 74 of the second component 70 faces the secondary surface portion 83. The first component 50 is then arranged on the primary surface portion 82 such that the outer surface 54 of the first component 50 faces the primary surface portion 82 and such that the first primary joint surface 59 is facing the second joint surface 79 of the second component 70. The first joining device 100 is attached to the first component 50 by attaching the attachment part 102 of the first joining device 100 to the outer surface 54 of the first component 50. The attachment part 102 may be a suction cup for providing a negative pressure between the joining device 100 and the outer surface 54 of the first component 50. The first joining device 100 may be in an extended configuration and start transitioning towards the second configuration, i.e. the retracted configuration. Thereby, the first joining device 100 may apply a force to the first component 50 to force the outer surface 54 of the first component 50 towards the primary surface portion 82 and the first primary joint surface 59 towards the second joint surface 79. An adhesive 108 may be applied between the first primary joint surface 59 and the second joint surface 79 before the first component 50 is arranged. When the first joining device 100 has transitioned into the second configuration the joint 44 between the first component 50 and the second component 70 is formed. The force applied by the first joining device 100 may be maintained during curing of the adhesive 108

After assembly of the first component 50 and the second component 70 the outer surface 54 of the first component and the outer surface 74 of the second component may be over laminated or an external sealant may be applied across the junction where the outer surfaces 54, 74 meet.

The second component 70 may be fixated by the second joining device 110. However, the second component 70 may also be arranged without attachment to a second joining device 110. Provision of the second joining device 110 may aid in conforming the outer surface 74 of the second component 70 to the surface 81 of the support 80, such as to facilitate the desired shape of the shell section formed by the components 50, 70.

Figure 4:
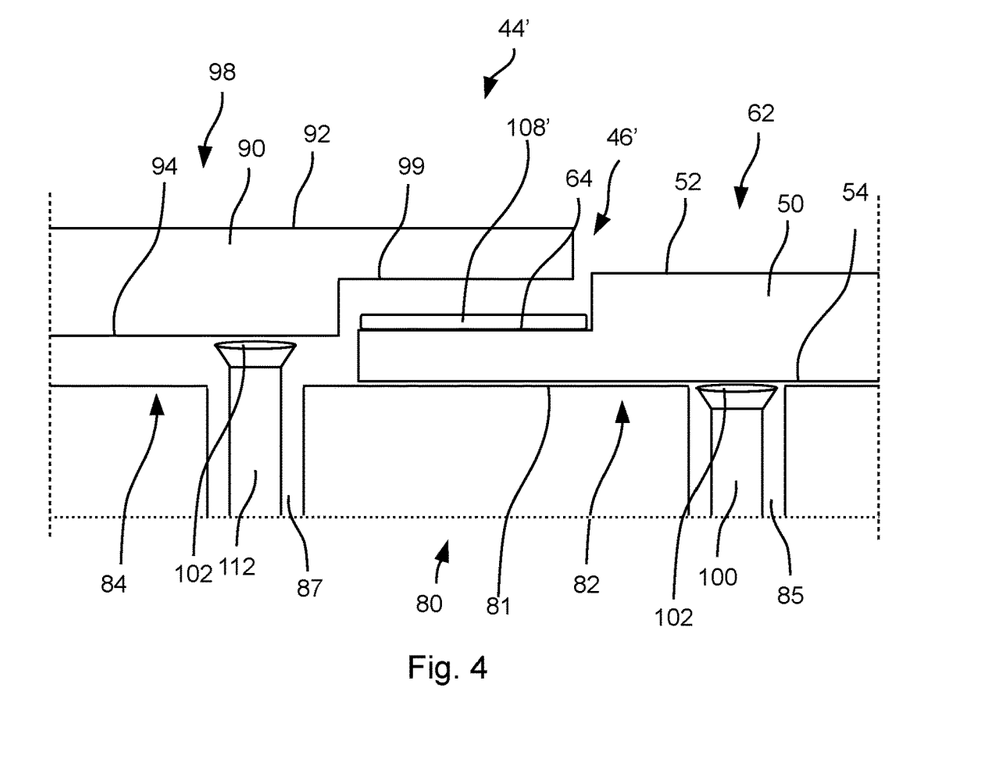
FIG. 4 is a schematic diagram illustrating an exemplary shell section of a wind turbine blade.

FIG. 4 is a schematic diagram illustrating a joint 44' formed by the first component of FIG. 3 and a third component 90, such as the third component 90 of FIG. 2. The joint 44' may be formed subsequently to the joint 44 as described in relation to FIG. 3.

The joint 44' may be formed by arranging the third component 90 on the support 80. The support comprises a tertiary surface portion 84 configured to support the third component 90. A third joining device 112 may be configured to extend and retract from a tertiary opening 87 in the tertiary surface portion 84. The third joining device 112 comprises an attachment part 102 configured to attach to the outer surface 94 of the third component 90. The third joining device 112 is configurable between a first configuration where it is extended and a second configuration where it is retracted. In the extended configuration the third joining device 112 extends from the surface 81 of the support 80. In the retracted configuration the third joining device 112 does not extend from the surface 81 of the support 80.

The first component 50 comprises a first secondary joint surface 64 opposite the outer surface 54 of the first component 50 and the third component 90 comprises a third joint surface 99 opposite the inner surface 92 of the third component 90. The first secondary joint part 62 and the third joint part 98 may form a lap joint.

The joint 44' is formed by arranging the third component 90 on the tertiary surface portion 84 such that the outer surface 94 of the third component 90 faces the tertiary surface portion 84 and such that the first secondary joint surface 64 is facing the third joint surface 99 of the third component 90. The third joining device 112 is attached to the third component 90 by attaching the attachment part 102 of the third joining device 112 to the outer surface 94 of the third component 90. The attachment part 102 may be a suction cup for providing a negative pressure between the third joining device 112 and the outer surface 94 of the third component 90. The third joining device 112 may be in an extended configuration and start transitioning towards the second configuration, i.e. the retracted configuration. Thereby, the third joining device 112 may apply a force to the third component 90 to force the outer surface 94 of the third component 90 towards the tertiary surface portion 84 and the third joint surface 99 towards the first secondary joint surface 64 of the first component 50. An adhesive 108' may be applied between the first secondary joint surface 64 and the third joint surface 99 before the third component 90 is arranged. When the third joining device 112 has transitioned into the second configuration the joint 44' between the first component 50 and the third component 90 is formed. The force applied by the third joining device 112 may be maintained during curing of the adhesive 108'.

After assembly of the first component 50 and the third component 90 the outer surface 54 of the first component 50 and the outer surface 94 of the third component 90 may be over laminated or an external sealant may be applied across the junction where the outer surfaces 54, 94 meet.

The first component 50 may be fixated by the first joining device 100, while arranging the third component 90, as illustrated. However, the third component 90 may also be arranged without the first component 50 being attached to the first joining device 100.

FIGS. 3 and 4 are described in relation to a first component 50, a second component 70, and a third component 90, such as the first component 50, the second component 70 and the third component 90 of FIG. 2. But the description may also apply to other (additional) components. Particularly, it is emphasized that the first component 50, second component 70 and third component 90 as described with respect to FIGS. 3 and 4, may correspond to any abutting components of the wind turbine blade of FIG. 2.

Figure 5:
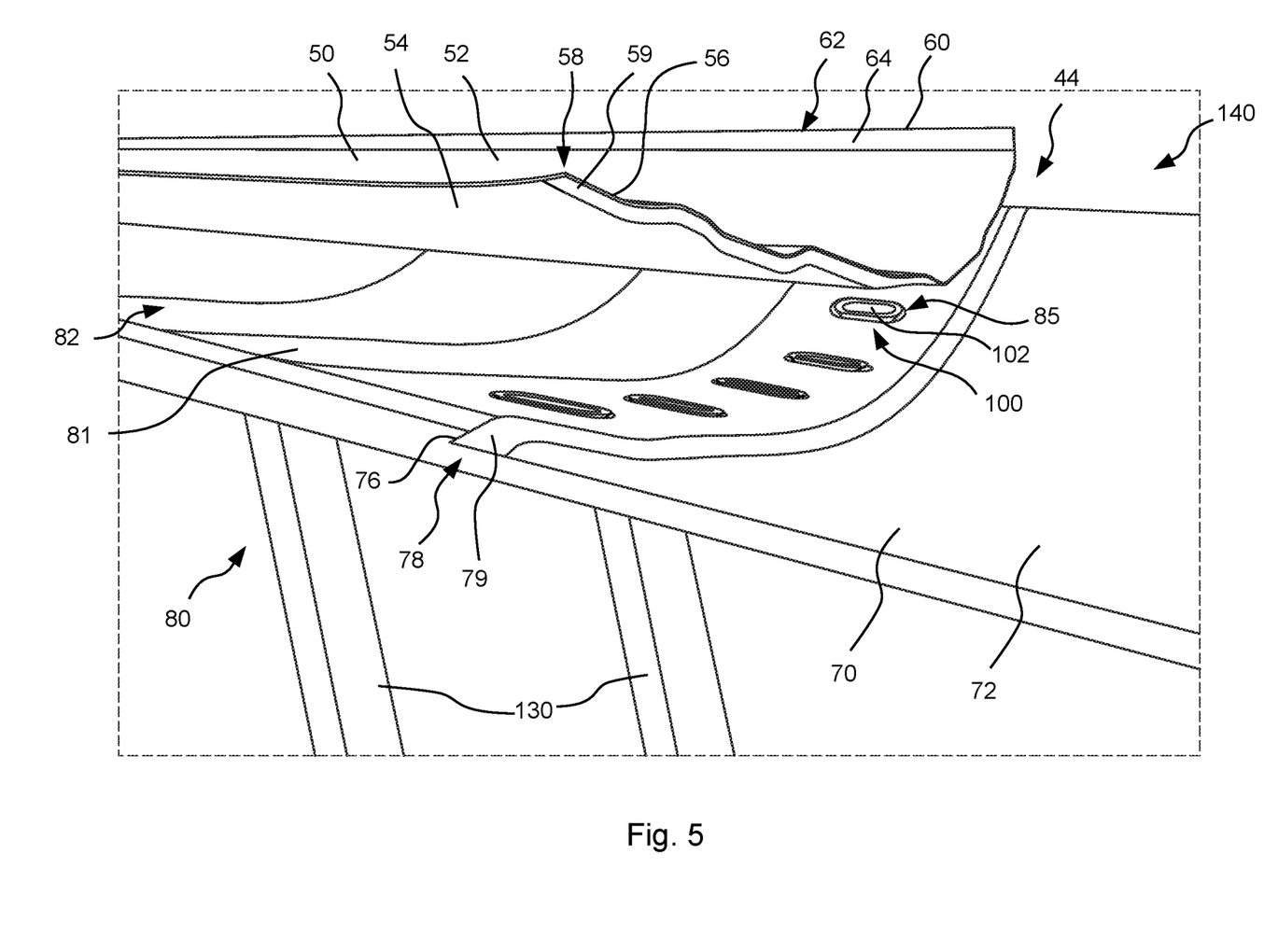
FIG. 5 is a schematic diagram illustrating a system for assembling a shell section.

FIG. 5 is schematic diagram illustrating a system 140 for assembling a shell section. The system 140 comprises a support 80 comprising a surface 81 having a primary surface portion 82. The system 140 may be suspended on suspensions 130, such as legs. The second component 70 is arranged on the secondary surface portion (not visible) such that the outers surface (not visible) of the second component 70 faces the secondary surface portion. The second component 70 comprises a second joint part 78 along a second end 76, which may form a joint 44 with the first component 50, e.g. as described in relation to FIG. 3. The second joint part 78 comprises a second joint surface 79 opposite the outer surface of the second component 70.

The first component 50 is to be arranged on the primary surface portion 82. The first component 50 comprises an inner surface 52 and an outer surface 54 opposite the inner surface 52. The first component 50 comprises a first primary joint part 58 at the first primary end 56. The first primary joint part 58 comprises a first primary joint surface 59 opposite the inner surface 52 of the first component 50. The first component 50 may be arranged on the primary surface portion 82 by attaching joining devices, such as a first joining device 100 and/or a plurality of first joining devices 100 as illustrated, to the outer surface 54 of the first component 50. The first joining device 100 is illustrated in a substantially retracted configuration. However, during attachment to the first component 50 joining devices, including the first joining device 100, may be in a substantially extended configuration.

The first component 50, as illustrated in FIG. 5, comprises a first secondary joint part 62 along a first secondary end 60. As illustrated in FIG. 5, and as opposed to the example of FIG. 3, the first primary end 56 and the first secondary end 60 may be substantially perpendicular, such as between 80-100 degrees. The first secondary joint part 62 comprises a first secondary joint surface 64. The first secondary joint surface 64 may be configured to be joined with another component, such as a third component 90, e.g. as explained in relation to FIG. 4. The first secondary joint surface 64 may face opposite the outer surface 54 of the first component 50.

The ends of the components, such as the first primary end 56, the second primary end 76, and/or the first secondary end 60 may be straight, as illustrated in FIG. 5. Alternatively, the ends may be waved, notched, or serrated or a combination thereof.

Figure 6:
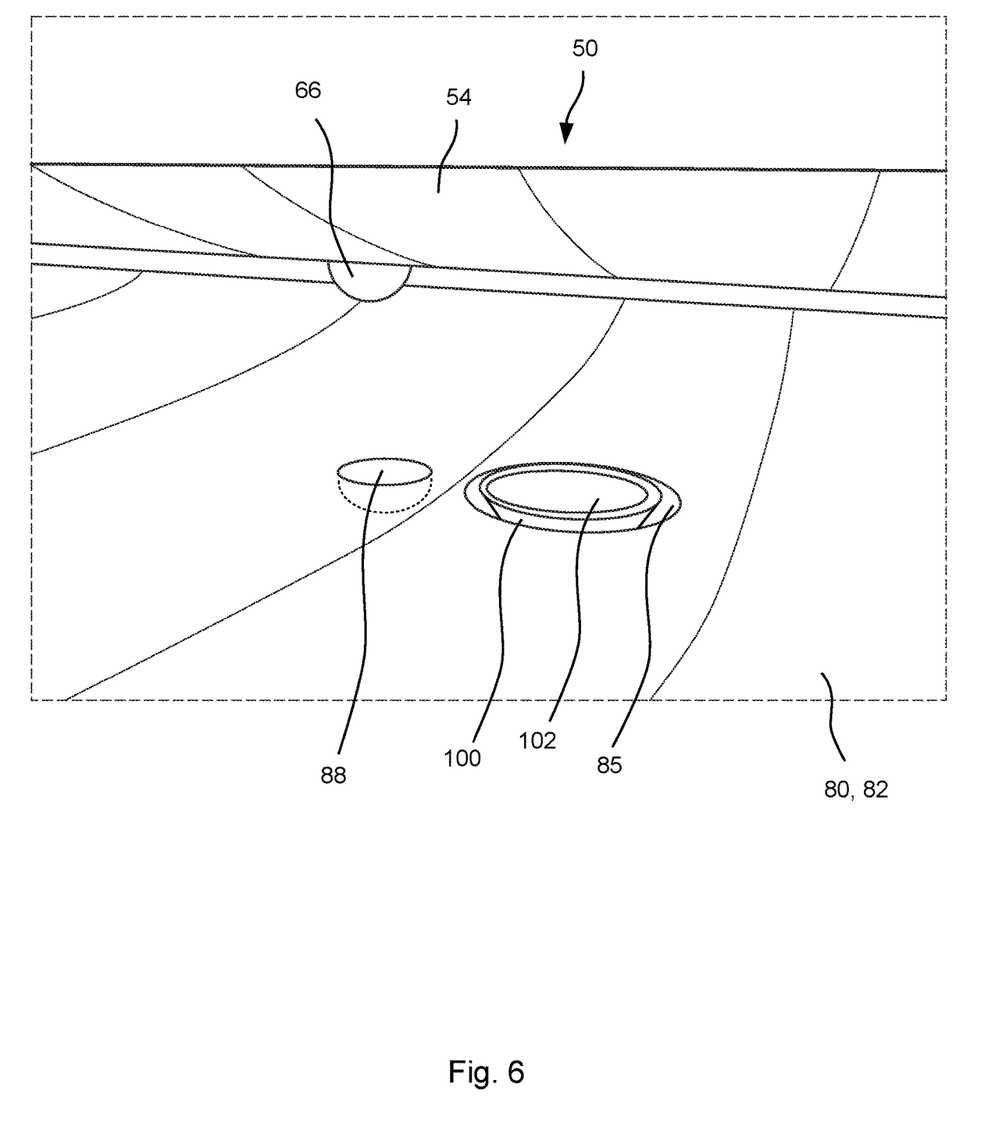
FIG. 6 is a schematic diagram illustrating part of a system.

FIG. 6 is schematic diagram illustrating a support 80 and a component, such as the first component 50. The following description is described with a first component 50 and primary surface portion 82, such as the first component 50 and primary surface portion 82 of FIGS. 2-5. However, the description may also apply to other surface portions and components, e.g. the second component 70 and the secondary surface portion 83 or the third component 90 and the tertiary surface portion 84 of any of FIGS. 2-5.

The primary surface portion 82 comprises an opening 85 where a joining device 100 may extend through. The joining device 100 may comprise an attachment part 102 configured for attaching with the outer surface 54 of the first component 50.

The first component 50 comprises a first alignment part 66 and the primary surface portion 82 comprises a primary alignment part 88. When the first component 50 is arranged on the primary surface portion 82 the first alignment part 66 and the primary alignment part 88 engages, thus the first component 50 self-aligns on the primary surface portion 82. The first alignment part 66 and the primary alignment part 88 may have a male and female configuration, e.g. a protrusion and a hole or a recess. For example, the first alignment part 66 may comprise a protrusion and the primary alignment part 88 may be formed by a recess. In FIG. 6 the first alignment part 66 and the primary alignment part are illustrated as spherical, but they may have any suitable shape for engaging with each other. The first component 50 may comprise a plurality of first alignment parts 66 and the primary surface portion 82 may correspondingly comprise a plurality of primary alignment parts 88.

Similarly, the second component 70, as illustrated in the previous figures, may comprise one or more second alignment parts and the secondary surface portion 83 may correspondingly comprise one or more secondary alignment parts. Similarly, the third component 90, as illustrated in the previous figures, may comprise one or more third alignment parts and the tertiary surface portion 84 may correspondingly comprise one or more tertiary alignment parts.

Alternatively, the first component may comprise a first alignment part and the second component may comprise a second alignment part, such that the first alignment part engages with the second alignment part when the two components are arranged on top of each other. The first alignment part and the second alignment part may have a male and female configuration, e.g. a protrusion and a hole or a recess. The first alignment part may be located on first primary joint surface and the second alignment part may be located on the second joint surface.

Figure 7:
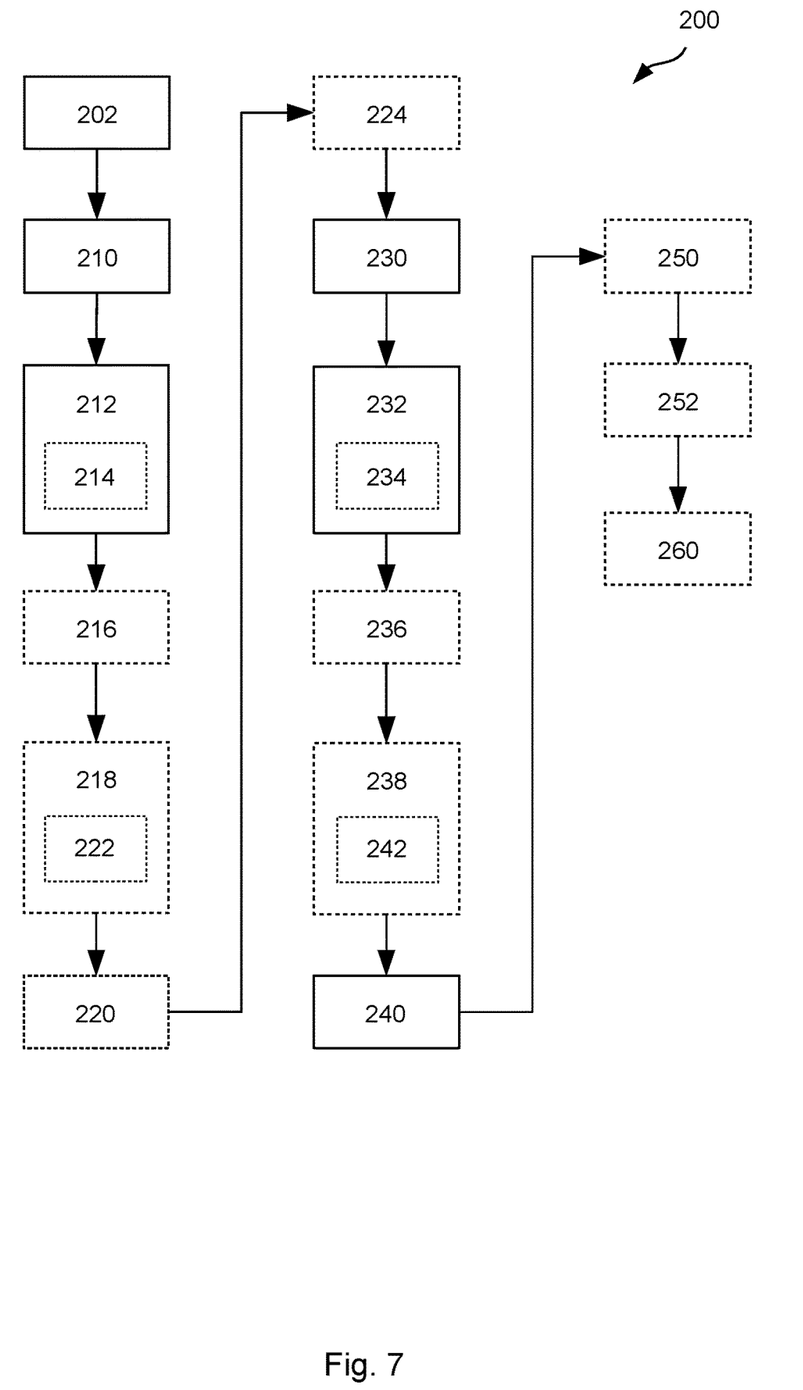
FIG. 7 is a diagram illustrating an exemplary method for assembling a shell section.

FIG. 7 is a diagram illustrating an exemplary method 200 for assembling a wind turbine blade, such as a wind turbine blade 10 as described in relation to the previous figures.

The method 200 comprises providing 202 a support, such as the support 80 as described in relation to FIGS. 3-6. The support comprises a surface having a primary surface portion configured for supporting a first component and a secondary surface portion configured for supporting a second component.

The method 200 comprises providing 210 a second component, such as the second component of FIGS. 2-5. The second component comprises an inner surface, an outer surface, a second end, and a second joint part along the second end. The second joint part comprises a second joint surface facing opposite the outer surface of the second component.

The method 200 comprises arranging 212 the second component on the secondary surface portion, such that the outer surface of the second component is facing the secondary surface portion. The second component may comprise a second alignment part and the secondary surface portion may comprise a secondary alignment part, e.g. as described in relation to FIG. 6. Arranging 212 the second component on the secondary surface portion may comprise engaging 214, e.g. aligning, the second alignment part with the secondary alignment part. The second alignment part and the secondary alignment part may have a male and a female configuration.

The method 200 may comprise providing 216 a second joining device, as described in more detail above. The second joining device may be configurable between a first configuration wherein an attachment part of the second joining device is extending from the secondary surface portion and a second configuration wherein the attachment part is retracted and do not extend from the secondary surface portion.

The method 200 may comprise attaching 218 the attachment part of the second joining device to the outer surface of the second component. Attaching 218 the attachment part of the second joining device to the outer surface of the second component may comprise providing 222 negative pressure between the attachment part of the second joining device and the outer surface of second component.

The method 200 may comprise applying 220 a force to the second component, e.g. by the second joining device, to force the outer surface of the second component towards the secondary surface portion. For example, applying 220 the force may comprise transitioning the second joining device from the first configuration towards the second configuration, while the attachment part of the second joining device is attached to the outer surface of the second component.

The method 200 comprises providing 230 a first component, such as the first component of FIGS. 2-5. The first component comprises an inner surface, an outer surface, a first primary end and a first primary joint part along the first primary end. The first component may further comprise a first secondary end and a first secondary joint part along the first secondary end. The first primary joint part comprises a first primary joint surface facing opposite the inner surface of the first component. The first secondary joint part comprises a first secondary joint surface facing opposite the outer surface of the first component.

The method 200 comprises arranging 232 the first component on the primary surface portion, such that the outer surface of the first component is facing the primary surface portion, and such that the first primary joint surface of the first component is facing the second joint surface of the second component. The first component may comprise a first alignment part and the primary surface portion may comprise a primary alignment part, e.g. as described in relation to FIG. 6. Arranging 232 the first component on the primary surface portion may comprise engaging 234, e.g. aligning, the first alignment part with the primary alignment part. The first alignment part and the primary alignment part may have a male and a female configuration.

The method 200 may comprise providing 236 a first joining device, as described in more detail above. The first joining device may be configurable between a first configuration wherein an attachment part of the first joining device is extending from the primary surface portion and a second configuration wherein the attachment part is retracted and do not extend from the primary surface portion.

The method 200 may comprise attaching 238 the attachment part of the first joining device to the outer surface of the first component. Attaching 238 the attachment part of the first joining device to the outer surface of the first component may comprise providing 242 negative pressure between the attachment part of the first joining device and the outer surface of first component.

The method 200 comprises applying 240 a force to the first component, e.g. by the first joining device, to force the outer surface of the first component towards the primary surface portion and the first primary joint surface towards the second joint surface. For example, applying 240 the force may comprise transitioning the first joining device from the first configuration towards the second configuration, while the attachment part of the second joining device is attached to the outer surface of the second component.

The method 200 may comprise applying 224 an adhesive between the first primary joint surface and the second joint surface. The adhesive may be applied 224 on the second joint surface and/or on the first primary joint surface. The adhesive may be applied 224 before the first component is arranged 232 on the primary surface.

The method 200 may comprise providing 250 a third component comprising an inner surface, an outer surface, a third end, and a third joint part along the third end. The third joint part may comprise a third joint surface facing opposite the inner surface of the third component.

The method 200 may comprise arranging 252 the third component on a tertiary surface portion of the support such that the outer surface of the third component is facing the tertiary surface portion, and such that the first secondary joint surface is facing the third joint surface of the third component.

The method 200 may comprise smoothing 260 the outer surface of the first component and/or the second component and/or the third component after assembly of the shell part. For example, the protrusion of the alignment parts of the components may be cut off or be polished down to fluctuate with the outer surface of the component.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
38 cord line
39 shoulder
42 shear web or spar side
44, 44' joint
46, 46' junction
50 first component
52 inner surface
54 outer surface
56 first primary end
58 first primary joint part
59 first primary joint surface
60 first secondary end
61 first tertiary end
62 first secondary joint part
64 first secondary joint surface
66 first alignment part
67 first quaternary end
70 second component
72 inner surface
74 outer surface
75 second alignment part
76 second end
77 second tertiary end
78 second joint part
79 second joint surface
80 support
81 surface
82 primary surface portion
83 secondary surface portion
84 tertiary surface portion
85 primary opening
86 secondary opening
87 tertiary opening 88 primary alignment part
89 secondary alignment part
90 third component
92 inner surface
94 outer surface
96 third end
98 third joint part
99 third joint surface
100 first joining device
102 attachment part
108, 108' adhesive
110 second joining device
112 third joining device
120 fourth component
130 suspensions
140 system
200 method
202 providing support
210 providing second component
212 arranging second component
214 aligning alignment parts
216 providing second joining device
218 attaching second component
220 applying force
222 providing negative pressure
224 applying adhesive
230 providing first component
232 arranging first component
234 aligning alignment parts
236 providing first joining device
238 attaching first component
240 applying force
242 providing negative pressure
250 providing third component
252 arranging third component
260 smoothing
L longitudinal axis

What is claimed is:

1. A method for assembling a shell section of a wind turbine blade, the method comprising:
providing a support comprising a surface having a primary surface portion configured for supporting a first component and a secondary surface portion configured for supporting a second component;
providing the first component comprising an inner surface, an outer surface, a first primary end and a first primary joint part along the first primary end, wherein the first primary joint part comprises a first primary joint surface facing opposite the inner surface of the first component;
providing the second component comprising an inner surface, an outer surface, a second end, a second joint part along the second end, wherein the second joint part comprises a second joint surface facing opposite the outer surface of the second component;
arranging the second component on the secondary surface portion such that the outer surface of the second component is facing the secondary surface portion;
arranging the first component on the primary surface portion such that the outer surface of the first component is facing the primary surface portion, and such that the first primary joint surface of the first component is facing the second joint surface of the second component;
providing a first joining device configurable between a first configuration, wherein an attachment part of the first joining device is extending from the primary surface portion and a second configuration, wherein the attachment part is retracted and does not extend from the primary surface portion;
attaching the attachment part to the outer surface of the first component; and
applying a force to the first component to force the outer surface of the first component towards the primary surface portion and the first primary joint surface towards the second joint surface, wherein applying the force to the first component comprises transitioning the first joining device from the first configuration towards the second configuration to apply the force to the first component.

2. The method of claim 1, wherein attaching the attachment part to the first component comprises providing negative pressure between the attachment part and the outer surface of the first component.

3. The method of claim 1, wherein the first joining device in the first configuration extends through a primary opening in the primary surface portion.

4. The method of claim 1, further comprising applying an adhesive between the first primary joint surface and the second joint surface.

5. The method of claim 1, further applying a force to the second component to force the outer surface of the second component towards the secondary surface portion.

6. The method of claim 5, further comprising providing a second joining device configurable between a first configuration wherein an attachment part of the second joining device is extending from the secondary surface portion and a second configuration wherein the attachment part is retracted and do not extend from the secondary surface portion, and wherein the method, after arranging the second component on the secondary surface portion, comprises attaching the attachment part to the outer surface of the second component, and wherein applying the force to the second component comprises transitioning the second joining device from the first configuration towards the second configuration to apply the force to the second component.

7. The method of claim 1, wherein the first component comprises a first secondary end and a first secondary joint part along the first secondary end, the first secondary joint part comprises a first secondary joint surface facing opposite the outer surface of the first component, the method comprising providing a third component comprising an inner surface, an outer surface, a third end, and a third joint part along the third end, wherein the third joint part comprises a third joint surface facing opposite the inner surface of the third component, the method further comprising arranging the third component on a tertiary surface portion of the support such that the outer surface of the third component is facing the tertiary surface portion, and such that the first secondary joint surface is facing the third joint surface of the third component.

8. The method of claim 7, wherein the first primary end and the first secondary end are non-parallel.

9. The method of claim 1, wherein the first component comprises a first alignment part and the primary surface portion comprises a primary alignment part, and wherein arranging the first component on the primary surface portion comprises engaging the first alignment part with the primary alignment part.

10. The method of claim 1, wherein the second component comprises a second alignment part and the secondary surface portion comprises a secondary alignment part, and wherein arranging the second component on the secondary surface portion comprises engaging the second alignment part with the secondary alignment part.

11. The method of claim 10, wherein the first alignment part and the primary alignment part have a male and a female configuration and/or the second alignment part and the secondary alignment part have a male and a female configuration.

* * * * *